United States Patent
Hertz et al.

(10) Patent No.: US 6,264,187 B1
(45) Date of Patent: Jul. 24, 2001

(54) METHOD AND APPARATUS FOR SELF-CONFORMING SUPPORT SYSTEM

(75) Inventors: Allen D. Hertz; Eric L. Hertz, both of Boca Raton; Anthony A. Imm, Sunrise; J. Stephen Wiggs, Parkland, all of FL (US)

(73) Assignee: Galahad, Co., Boca Raton, FL (US)

( * ) Notice: Subject to any disclaimer, the term of this patent is extended or adjusted under 35 U.S.C. 154(b) by 0 days.

(21) Appl. No.: 09/253,238

(22) Filed: Feb. 19, 1999

Related U.S. Application Data

(63) Continuation-in-part of application No. 09/170,016, filed on Oct. 13, 1998.

(51) Int. Cl.[7] ....................................... B25B 1/24
(52) U.S. Cl. ............................... 269/266; 269/21
(58) Field of Search .................... 269/21, 289 R, 269/266, 254 CS

(56) References Cited

U.S. PATENT DOCUMENTS

| | | |
|---|---|---|
| 4,047,709 * | 9/1977 | Thyberg et al. ................ 269/22 |
| 4,088,312 * | 5/1978 | Frosch et al. .................. 269/21 |
| 4,936,560 | 6/1990 | Barozzi . |
| 5,152,707 | 10/1992 | Dougherty et al. . |
| 5,157,438 | 10/1992 | Beale . |
| 5,551,677 | 9/1996 | Puettmer et al. . |
| 5,794,329 | 8/1998 | Rossmeisl . |
| 5,984,293 | 11/1999 | Abrahamson et al. . |

* cited by examiner

*Primary Examiner*—David A. Scherbel
*Assistant Examiner*—Daniel C. Shanley

(57) ABSTRACT

A method and apparatus are disclosed for a flexible support system using elongated support members to support a face of a module. The flexible support member(s) are arranged through a primary member with apertures, where the elongated support members are automatically returned to a home position by a self restoring mechanism, the position of the elongated support members are adjusted by the contacting forces applied by bringing the module and the flexible support apparatus together, then applying a clamping force to secure the elongated support members where the elongated support members can sustain the loads applied onto a module during an assembly process.

22 Claims, 10 Drawing Sheets

METHOD AND APPARATUS FOR SELF-CONFORMING SUPPORT SYSTEM

This is a continuation-in-part application of patent application Ser. No. 09/170,016 filed Oct. 13, 1998, entitled "Flexible, Self Conforming Workpiece Support System".

FIELD OF THE INVENTION

The present invention relates in general to a method of supporting planer and non-planer modules using elongated support members that automatically adjust to the contour of the modules. The elongated support members are subsequently restrained to conform to the contour of the modules to provide support to the module. Upon release of a clamping mechanism, the elongated support members are automatically returned to a home position by homing forces applied by a self restoring mechanism.

BACKGROUND OF THE INVENTION

Several processes used in the assembly of printed circuit assemblies (PCAs) require a means to support a PCA or module. This is particularly important during operations which apply force or pressure to an opposing side of the module. A supporting surface of the module may have components attached, forming a three dimensional surface.

One known method used for supporting the module is to machine custom contoured support plates designed to accommodate a three dimensional surface. There are several reasons why this solution is not desired. First, the time to manufacture the support plate reduces the Time-To-Market for the product. Secondly, the tooling plates are expensive. Thirdly, additional set up is required for each production run, significantly adding to the cost of the product.

A second known method used for supporting a module is to place fixed height, support members proximate to locations on the module that are substantially on the same plane. Utilizing this method for a PCA with bottom side parts, elongated support members would be placed in areas where no parts were present to support the planer PCB while not contacting or damaging the components. This process is difficult to repeat, and costly to automate (U.S. Pat. No. 5,794,329, Rossmeisl, et al). The PCA must be designed such that there is sufficient clearance for the contact area of the supporting pins. For an automated placement system, the system must be programmed, which is time consuming and may include errors.

A third known method described by Beale, U.S. Pat. No. 5,157,438, teaches the use of individual armatures and electromagnets magnets to selectively clamp the elongated support members in a raised position or allow them to fall to a lowered position. The elongated support members are either fully extended or fully retracted. This method requires complex designs and systems to support it. If the elongated support members do not align with areas on the said module that are planer with the module, the elongated support members will fall to the lowered position, thus not adequately supporting the said module.

A fourth known method described by Barozzi, U.S. Pat. No. 4,936,560, discloses an assembly used to support a module utilizing support pins which are restrained via application of a frictional force to the pins. Barozzi describes an assembly that utilizes a pair of plates to mount a number of pins. The pins are restrained in a home position using a frictional force. A workpiece on a machining line is then impressed upon the pins to form a three dimensional support fixture. After the workpiece is machined, an additional step is required to reset the pins to the home position utilizing a separate mechanism. There are a number of disadvantages to this method. First, the frictional force applied to the sides of the pins is difficult to control and would not be suitable for the manufacture of electronic modules. Over time, dirt, solder paste and other materials used in the assembly of modules may fall down onto the assembly changing the coefficient of friction between a lamallar spring and the pins. This additional force may damage the module. Once the pin begins to move, the frictional force is reduced, as it changes from static to dynamic friction, again making it more difficult to control. The additional force required to initiate pin movement may damage the module suggesting a serious disadvantage. Secondly, the pins would be subject to wear causing a change in the coefficient of friction between the lamallar spring and the pins. This type of wear would cause the pins to fall and not properly support the workpiece. Thirdly, the assembly has no automatic reset mechanism. This is a major deficiency because of the time required to reset the assembly utilizing a separate mechanism. Fourthly, the assembly utilizes two locking plates adding additional cost to the assembly. Lastly, the pins are fluted on the ends, disallowing removal when required by the profile of the module or the proximity to fragile components. Removal of pins is also necessary in electronics manufacturing so that the pins and the assembly may be cleaned and serviced.

A fifth known method described by Dougherty, U.S. Pat. No. 5,152,707, discloses an assembly used to support a color cathode ray picture tube, having a substantially flat face panel. Dougherty teaches a supporting anvil which uses a plurality of elongated support members which move axially through a plurality of split sleeves. The split sleeves are encased a plurality of flexible tubes. The plurality of split sleeves encased in flexible tubes are located within a chamber. The chamber pressurizes, where the pressure causes the flexible tubing to collapse the split sleeves, where the split sleeves apply pressure to the elongated support members, thus securing them in place. Dougherty utilizes pressurized fluid to urge the elongated support members into near pressureless (10 lbs/in$^2$) contact with the panel through the pressurization of a second chamber. The process flow includes locating the module, pressurizing the second chamber to raise each individual elongated support member to contact the panel. Subsequent to contact, the first chamber is pressurized to secure the elongated support members, thus supporting the module. The module is then processed, and removed.

Dougherty, while contributing to the art, clearly has disadvantages when applied to electronics module manufacturing. State of the art solder screen printers, component placement equipment, and dispensers have a mechanical table which is actuated when the module is in position. The table in each of these cases, raises to place pins or other supporting devices, described above, proximate the module. Dougherty discloses individual pins raising to a flat panel. If used in conjunction with a raising table, additional proximity switches, sensors, logic and actuators would be required to ensure no damage is done to the module. Additionally, cycle time is critical in high speed assembly lines such as those used to manufacture electronic modules. The additional process time required to raise the elongated support members to the module after locating the module and raising the table, would require more time than economically allowed. Secondly, the nearly pressureless force of 10 lbs/in$^2$ is far greater than generally accepted limit of 250 grams (0.55 lbs) of applied force to components. The use of pressure dictates the requirement to seal the first chamber, including a seal around the elongated support members. The seal will introduce friction. The air pressure must overcome the gravitational forces of the elongated support members and the friction of the seal. The friction may vary between different elongated support members exerting different forces over the surface of the module. The seal will wear over time lowering the friction and changing the force applied to the module. Dougherty also includes a small continuous leakage to avoid entry of abrasives or slurries to minimize damage to these seals. The use of a pressure chamber increases the complexity of the apparatus should the system utilize vacuum to secure the module above the self conforming apparatus. Vacuum is often used to secure Printed Circuit Boards (PCB) during several processes, particularly as a means to remove any warpage. Thirdly, if one of the elongated support members were removed as is often required to preclude damage to sensitive components, the seal would be broken to the chamber making the pressurized lifting system inoperable. This limits the flexibility of the system for certain assemblies with sensitive components and is clearly a disadvantage. The use of pressure chambers, additional components, sensors, proximity switches, computer logic, and actuators are clearly not desired. Additionally, the use of a pressurized lifting chamber is not conducive to applications which require very narrow self conforming systems, such as the use in conveyorized, automated assembly equipment where there is limited distance between the conveyor and the base of the machine. Fourthly, the cycling of the split sleeves may cause them to permanently deform over time causing additional friction to the elongated support members, where the split sleeves would have to be replaced. The process to replace the split sleeves is time consuming and difficult, as they require breaking and recreating good air pressure seals.

Thus, what is desired is a method of supporting planer and non-planer modules that can create a profile to support a desirable face of any module without applying excessive forces to the module. The system should be designed to continuously operate with minimal cycle time, while being repeatable, serviceable, and should have minimal complexity.

SUMMARY OF THE INVENTION

The present invention addresses the deficiencies in the art by utilizing a self conforming module support system which is simple and repeatable.

One aspect of the present invention is to provide a means to support the face of a module during an operation in which forces are applied to an opposing face of the module.

A second aspect of the present invention is to provide a means to support the module using at least one elongated support member, where the preferred embodiment may include multiple support members, preferably located in an array.

A third aspect of the present invention is to provide a means to automatically restore the elongated support members to a home position, through the inclusion of a self restoring mechanism such as a spring. Once in the home position, the elongated support members are adjusted to the contour of the contacting side of the module by bringing the support members and the module together.

A fourth aspect of the present invention is to provide a clamping force to restrain the elongated support members after the elongated support members are located proximate to the surface of the element.

A fifth, aspect of the present invention is to separate the module from the elongated support members, release the clamping force on the elongated support members and automatically return the elongated support members to a home position via homing forces applied by a self restoring mechanism.

A sixth aspect of the present invention allows the easy adjustment of the force applied by the resetting mechanism.

A seventh aspect of the present invention allows the easy installation or removal of the elongated support members from the primary assembly of the invention.

An eighth aspect of the present invention allows the self conforming support system to function using a thin profile. The invention can be described as an apparatus which consists of:

A primary member which includes at least one, but preferably an array, of perforations, where each perforation is slightly larger than the cross section of the respective elongated support member(s).

At least one elongated support member placed through the at least one perforations within the primary member.

A method to automatically raise the elongated support member(s) to a home position using a self restoring mechanism.

A clamping mechanism to lock the elongated support members in a profile position proximate a surface of the module. The desired profile is created by bringing the elongated support members and the module with its associated attached components together. The elongated support members may optionally have a variety of geometry's or materials at the contacting surface to minimize damage to the module during adjustments or support.

A clamping mechanism secures the elongated support members in the desired profile, proximate the module to provide the preferred support to the module.

The elongated support members and or the perforated members may have many optional geometry's or be of differing materials to provide the desired restraining forces corresponding to the desired application.

The surface of the elongated support members which contacts the module may be of materials which absorb impact to lower the potential damage to the module or components thereon.

DETAILED DESCRIPTION OF THE INVENTION

Figure 1:
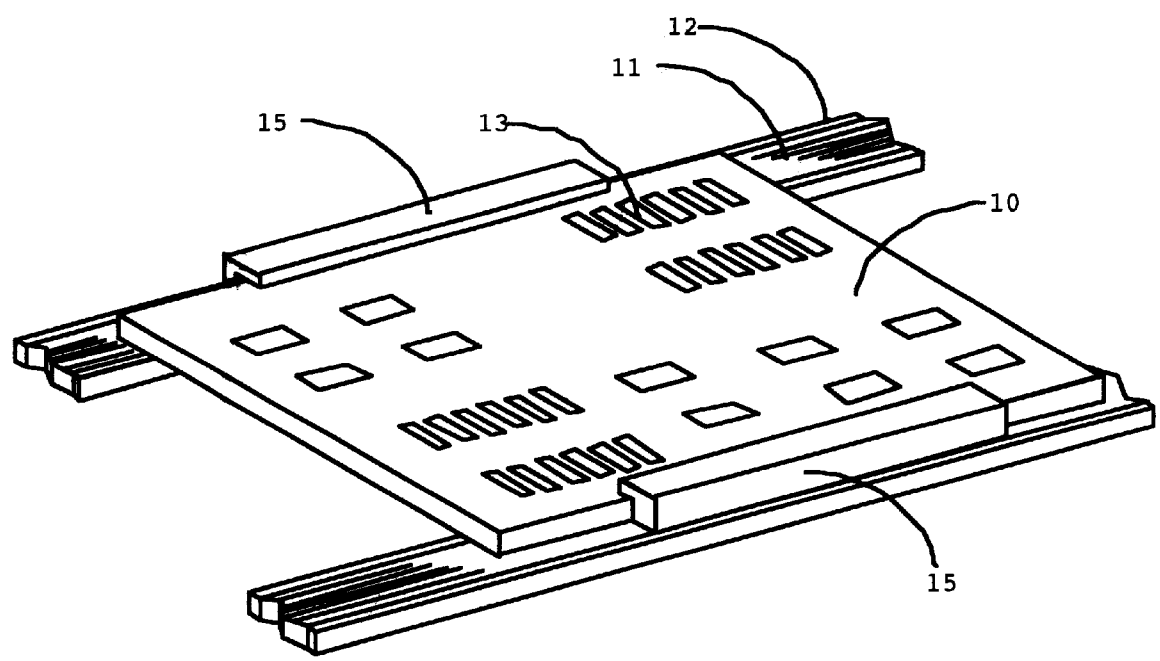
FIG. 1 is an isometric view of a module, in this case a PCA, located on the conveyor of a workstation.

FIG. 1 is an isometric view of a PCA (module) 10 illustrating the module 10 located on a conveyor belt 11 within the workstation (not shown). The module 10 is transferred into and out of the workstation via a conveyor belt 11. The conveyor belt 11 rides along the conveyor rail 12. After transferring the module 10 to the desired location within the workstation, the module 10 is secured into location using a securing mechanism 15, in this case illustrated as clamps. Optionally, some workstations use vacuum, which is not shown in this figure. The module 10 is secured to ensure accuracy throughout the operation of the workstation. One reason to secure the module 10 into location is to maintain placement accuracy for various component locations 13.

Figure 2:
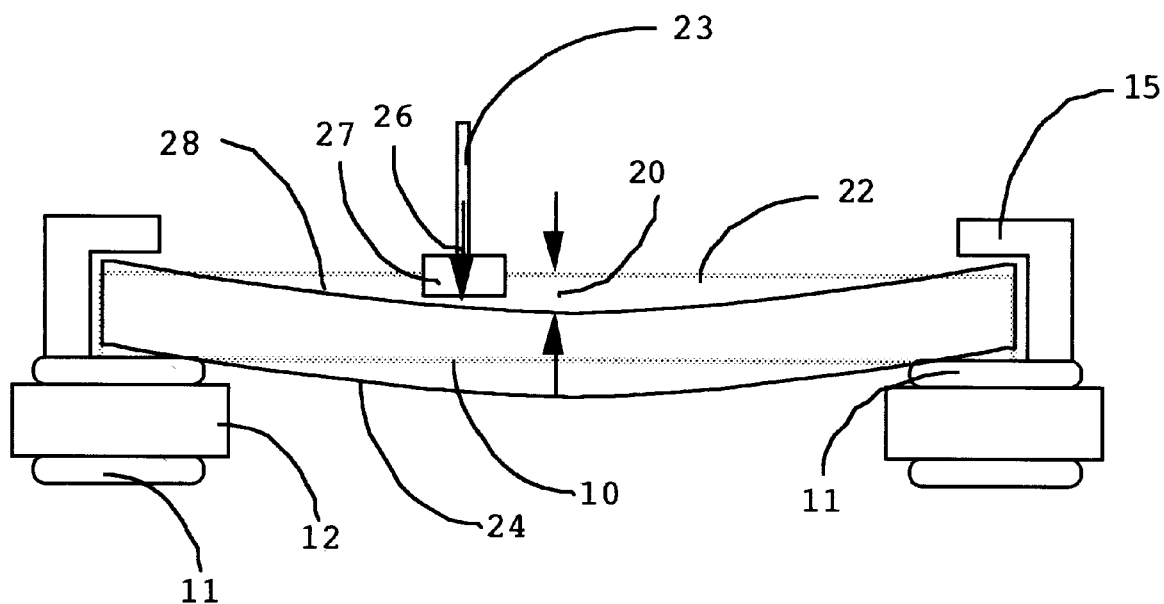
FIG. 2 is a sectional side elevation that illustrates the undesirable deformation of the module, in this case a PCA, during the operation of a workstation.

FIG. 2 is a sectional side elevation illustrating a non-desirable deflection 20 of a module 10 during the operation of a workstation. The module 10 is located on the conveyor belt 11, as described by FIG. 1. The conveyor belt 11 rides along the conveyor rail 12. The module 10 is secured by a securing mechanism 15 to ensure accuracy during processing. The drawing illustrates, using a shadow line, a planer surface 22 of the module 10 prior to the subjection of loads 26 during the operation of workstation. The drawing illustrates a deflected surface 24 of the module 10 during the subjection of loads 26 during the operation of a workstation. This particular drawing illustrates an example of the assembly process of a PCA, depicting the impact of component 27 placement, where the workstation is placing a component 27 onto a surface 28 of the module 10 using a vacuum nozzle 23. A non-desirable deflection 20 of the module 10 has several negative effects of the assembly process, including moving the module 10 such that the location of the module 10 no longer corresponds with the registration of the equipment, bouncing the components 27 off the surface 28 upon placement, not providing a planer surface 22 during a screen-printing process, not providing a planer surface 22 during a dispensing process, not providing a planer surface 22 during component 27 placement, or where the components 27 are then dropped (instead of placed) onto the surface 28 of the module 10. It can be recognized that the implementation of a self conforming support apparatus may secure the module 10 to present a planer surface 22 during screen-printing, dispensing, and component placement.

Figure 3:
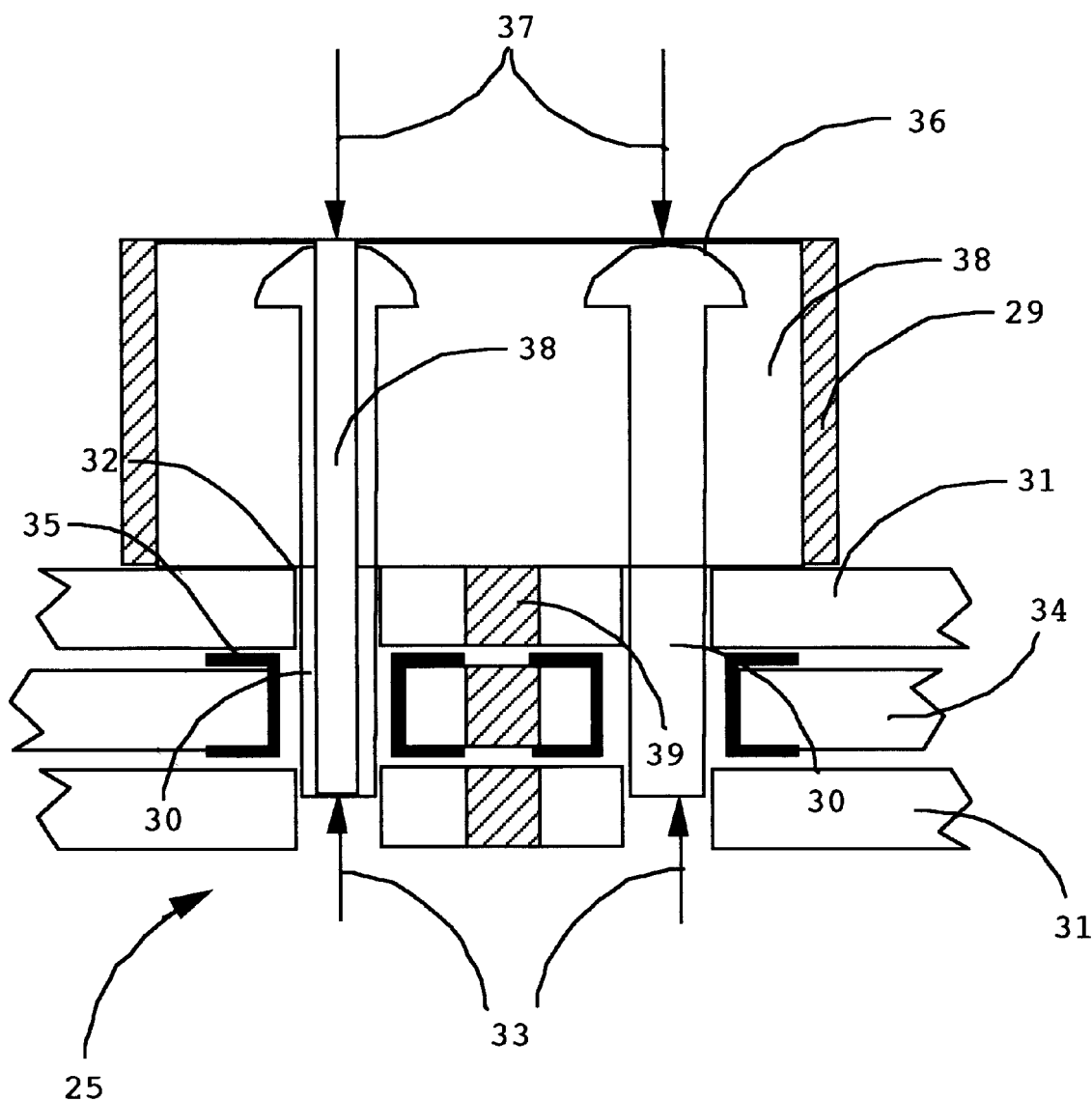
FIG. 3 is a sectional side elevation which illustrates a flexible support apparatus.

FIG. 3 is a sectional side elevation which illustrates the primary features of a flexible support apparatus 25. The figure also illustrates the inclusion of a vacuum securing system, which is generally associated with screen printing of electronics assemblies. The features include an elongated support member 30 which is used to support the module 10 (not shown in FIG. 3), a perforated member 31 which includes at least one aperture 32 used to guide the elongated support member(s) 30 during transition between a home position 50 (shown in FIG. 5) and a profile position 60 (Shown in FIG. 6), an automatic homing force 33 which raises the elongated support member(s) 30 to the home position 50, a contact surface 36 which receives a contact force 37 implied by the module 10 profiling the elongated support member(s) 30, and a clamping system 34 used to secure the elongated support member(s) 30 into the profile position 60. The clamping system 34 may require a tolerance accumulating medium 35, particularly if using a rigid material for the clamping system 34 and elongated support members 30 as shown in this drawing. The module may be secured and made planer by a vacuum system. The vacuum system includes a vacuum passage 39 to transfer vacuum from a vacuum source (not shown) to a vacuum chamber 38, where the vacuum chamber 38 is created by vacuum wall members 29. The vacuum wall members 29 are coupled to the perforated member 31, and preferably located within the peripheral edges of the module to optimize the vacuum. It can be recognized that the vacuum wall members may be adjustable. It can also be recognized that the vacuum chamber 38 may be included in the elongated support members 33 by making the elongated support members 33 hollow. The vacuum would transfer from the vacuum source through the bottom of each elongated support member 33 to the surface of the module (not shown).

Figure 4:
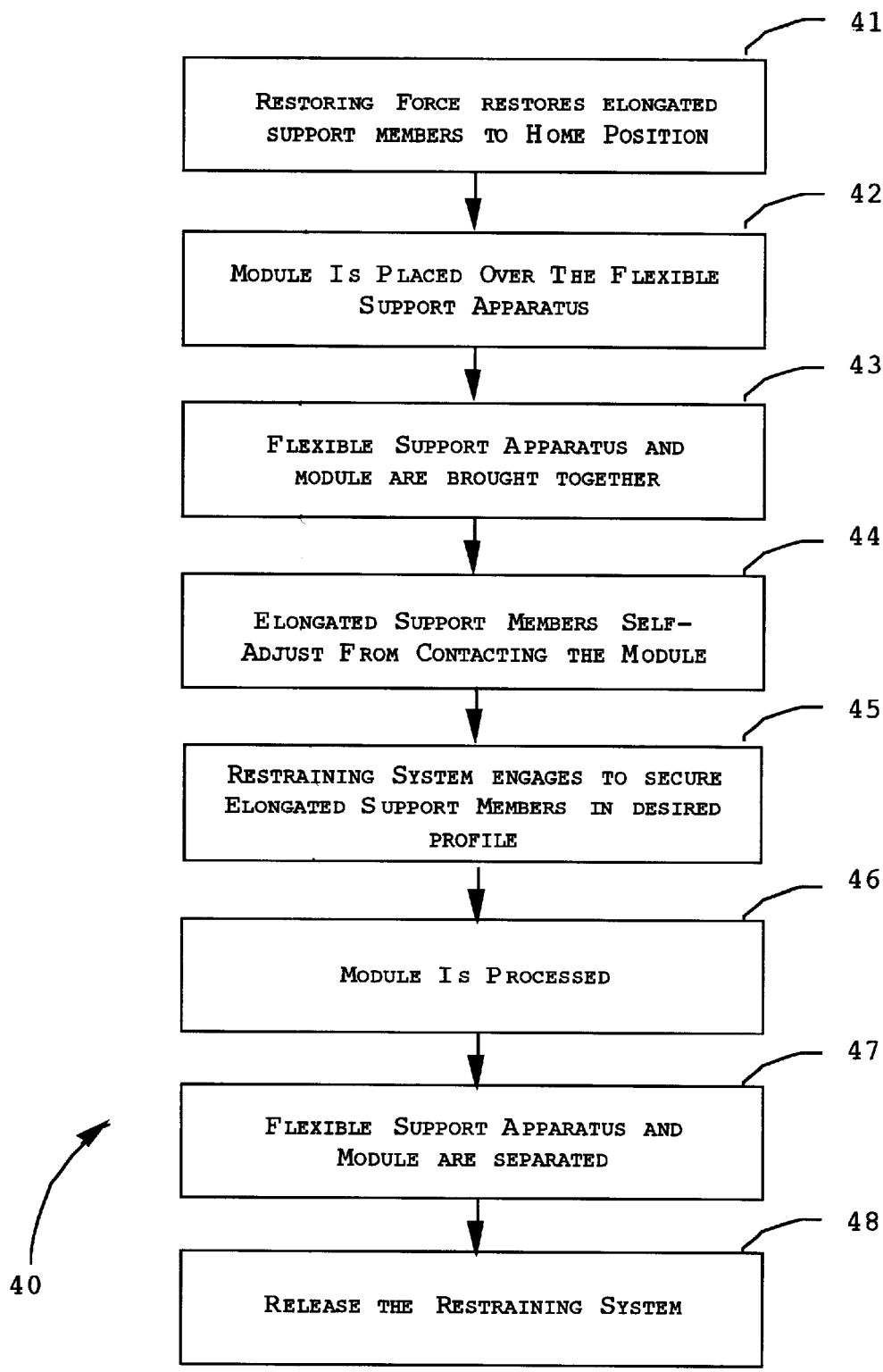
FIG. 4 is an operational flow diagram disclosing the method of the present invention.

FIG. 4 is an operational flow diagram 40 describing the general operational flow of the flexible support apparatus 25. The first step 41 is to reset the flexible support apparatus 25 where the elongated supporting member(s) 30 are placed in the home position 50. The flexible support apparatus 25 includes a means to automatically return the elongated support member(s) 30 to their home position by a homing force applied by a self restoring mechanism. The self restoring mechanism may include, but is not limited to coil springs, flat springs, stretched rubber, etc. The second step 42 in the operational flow diagram 40 is to locate the module 10 over the flexible support apparatus 25 and secure the module 10. The third step 43 in the operational flow diagram 40 is secure the module 10 and to bring the flexible support apparatus 25 and the module 10 together. The fourth step 44 in the operational flow diagram 40 is the self-adjustment of the elongated support member(s) 30 by using the contacting force 37 between the contacting surface 36 of the elongated support member(s) 30 and the module 10. The fifth step 45 of the operational flow diagram occurs after the flexible support apparatus 25 is brought to its final position in reference to the module 10. The clamping system 34 engages to secure the elongated support member(s) 30 proximate to the module 10. The sixth step 46 of the operational flow diagram 40 is to execute the process on the module 10. The seventh step 47 of the operational flow diagram 40 is to separate the flexible support apparatus 25 from the module 10 and remove the module 10. The eighth step 48 of the operational flow diagram 40 is to release the clamping system 34 of the flexible support apparatus 25 where the elongated support member(s) 30 are automatically returned to the home position 50, as in the first step 41.

Figure 5:
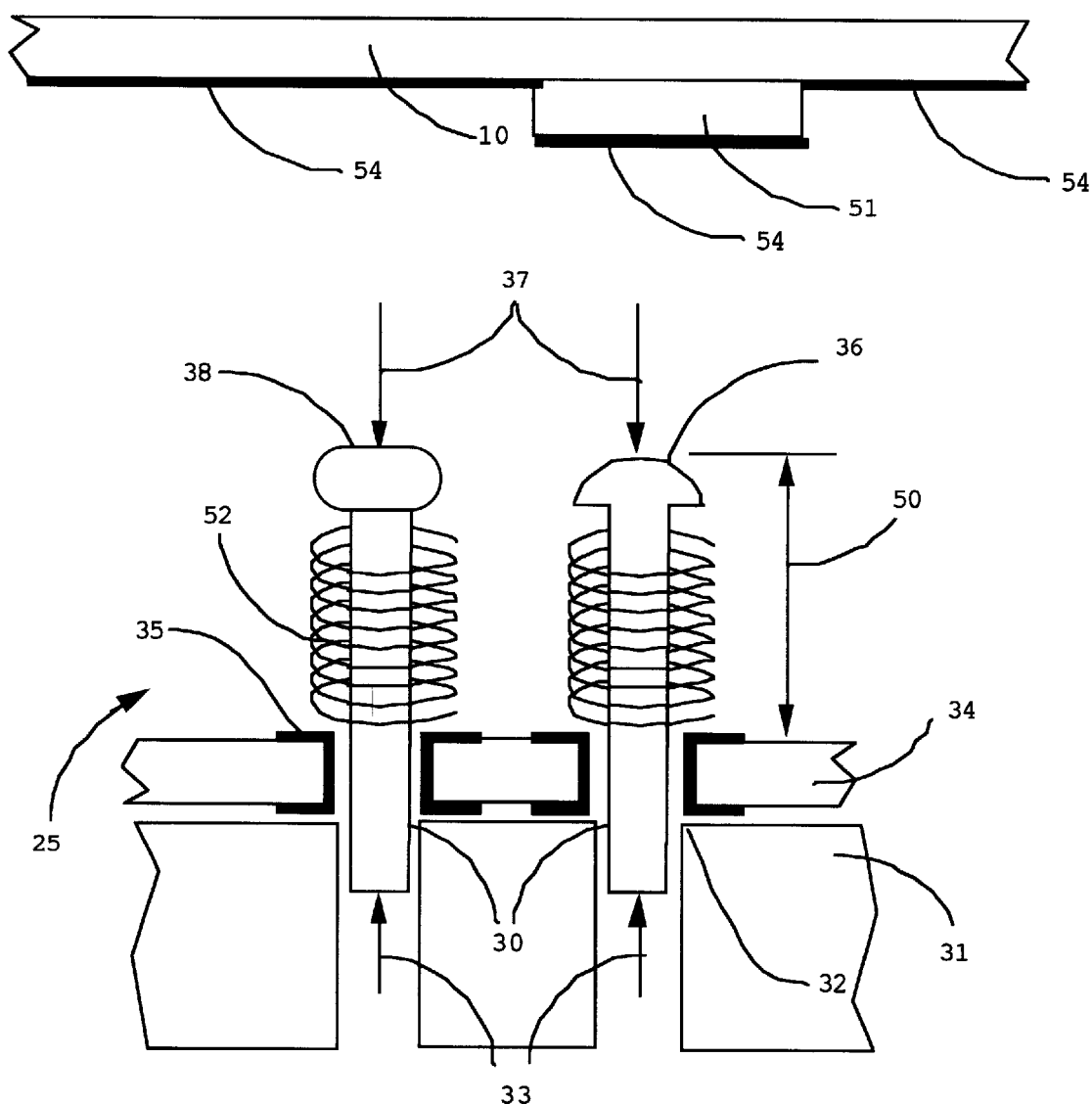
FIG. 5 is a sectional side elevation which illustrates a flexible support apparatus in the reset state or home position.

FIG. 5 illustrates a flexible support apparatus 25 in the home position 50. The elongated support member(s) 30 are placed to the home position 50 by a homing force 33. A coil spring is used in this figure to illustrate a self restoring mechanism 52 used to apply the homing force 33. The self restoring mechanism 52 is located above the perforated members to illustrate one embodiment of a flexible support apparatus which provides a narrow profile apparatus. The figure illustrates the ability to remove any elongated support member 30 and the respective self restoring mechanism 52 to provide clearance for items such as conveyors 12 or extra sensitive components 27. It can be recognized that many other urging devices may be used as self restoring mechanisms 52 may be used to apply the homing force 33. The module 10 to be supported, is shown above the flexible support apparatus 25 residing in the home position 50. A protrusion (shown as a component) 51 is attached to the module 10 to demonstrate the method which configures the flexible support apparatus 25 to a non-planer surface 54. One elongated support member 30 includes a pliant material 38 located at the end of the elongated support member 30 which contacts the module 10 to avoid damage to delicate surfaces of the module 10.

Figure 6:
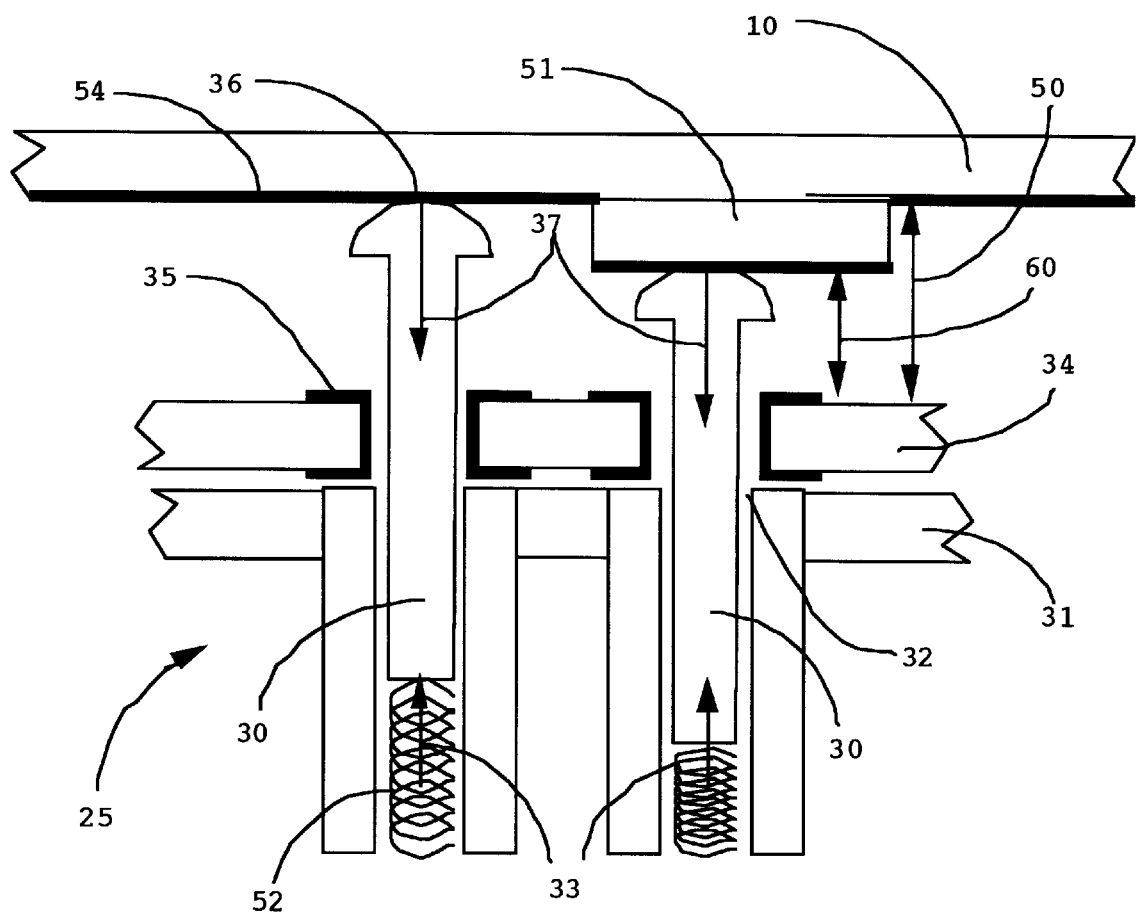
FIG. 6 is a sectional side elevation which illustrates a flexible support apparatus in the adjusting state.

FIG. 6 illustrates the flexible support apparatus 25 in the profile position 60. The flexible support apparatus 25 and module 10 are brought together. During this motion, the elongated support member(s) 30 are temporarily held in position by the homing force 33 resulting in positioning the elongated support member(s) 30 proximate to the contour of the module 10. This figure illustrates the self restoring mechanism 52 below the perforated member 31 as an alternative. The clamping system 34 is in the released state. Upon abutting the non-planer surface 54 of the module 10 or the non-planer surface 54 of the protrusions 51 which extend beyond the primary plane of the module 10, the module 10 or protrusion 51 exert a contact force 37 onto the elongated support member(s) 30; the contact force 37 overcomes the homing force 33 and causes the respective elongated supporting member 30 to move, as shown by comparing the home position 50 and the profile position 60 of the elongated support member(s) 30.

Figure 7:
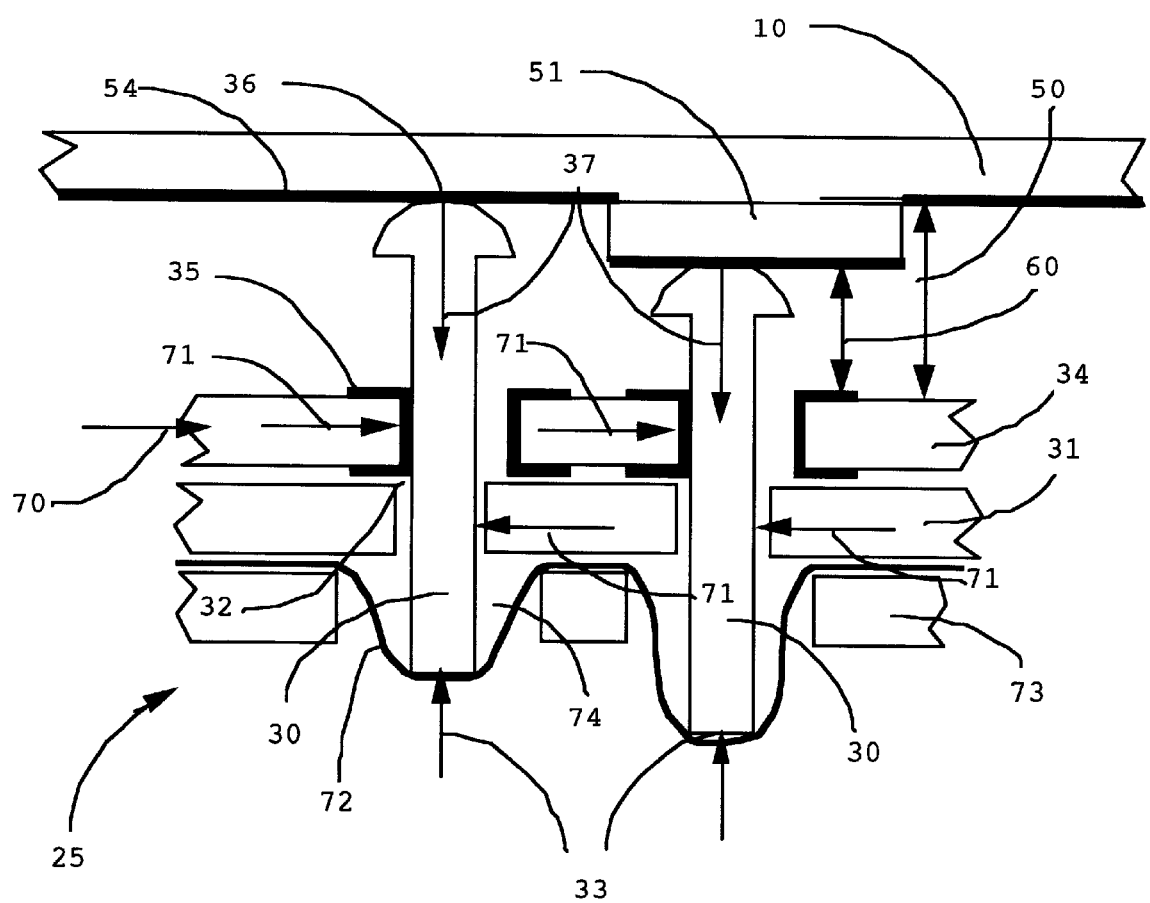
FIG. 7 is a sectional side elevation that illustrates a flexible support apparatus in a secured state.

FIG. 7 illustrates the flexible support apparatus 25 in the restrained state. The figure illustrates the elongated support member(s) 30 located against the module 10 and the protrusion 51. The elongated support member(s) 30 are temporarily held proximate to the module 10 by the homing force 33. The homing force illustrated in this figure utilizes a flexible material restoring mechanism 72, such as thin rubber, stretched between the first perforated member 31 and a second perforated member 73. The perforations within the second perforated member 73 are larger than the respective perforations in the first perforated member 31, where the difference in size (comparing the dimensions of aperture 74 within the second perforated member 73 and the dimension of the apertures 32 within the first perforated member 31) and the amount of stretch may be used to control the spring rate of the flexible material restoring mechanism 72. One example of a clamping system 34 is illustrated in the profile position 60, where the system actuates 70 to exert clamping forces 71 by pushing the elongated support member(s) 30 against the perforated member 31. The various opposing, clamping forces 71 restrain the elongated support member(s) 30 proximate to the module 10, where the contacting surface 36 supports the module 10.

Figure 8:
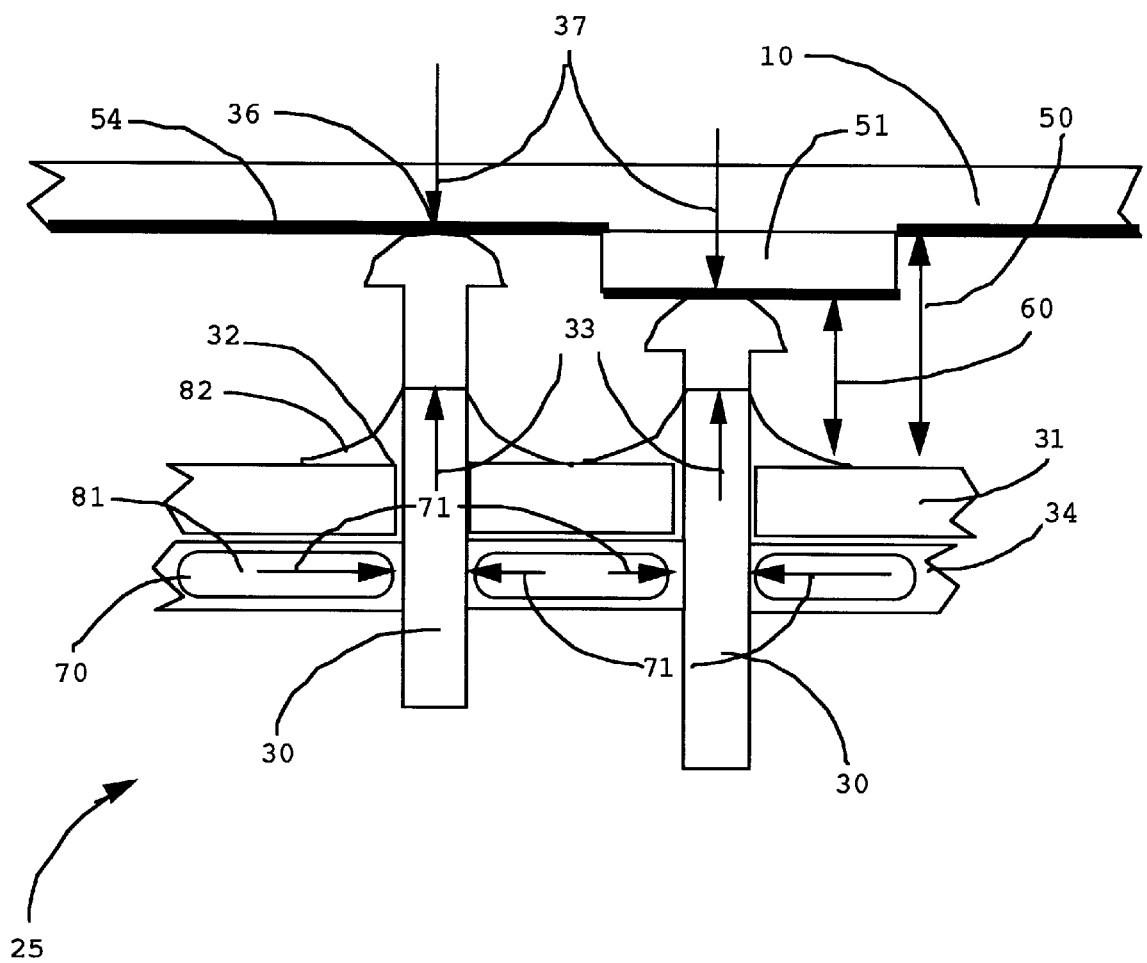
FIG. 8 is a sectional side elevation that illustrates a flexible support apparatus applying a bladder restraining mechanism in the secured state.

FIG. 8 illustrates a second embodiment of the present invention, where the clamping force 71 is applied by an expanding bladder 81 as well the use of a flat spring restoring mechanism 82. The flat spring restoring mechanism 82 is coupled to the elongated support members 30 and compressed when the module 10 and the self conforming support apparatus 25 are brought together. The embodiment is actuated 70 by enlarging the bladder 81 in the clamping system 34. The enlarged bladder 81 applies clamping forces 71 to the elongated support member(s) 30 proximate to the module 10, where the contacting surface 36 supports the module 10.

Figure 9:
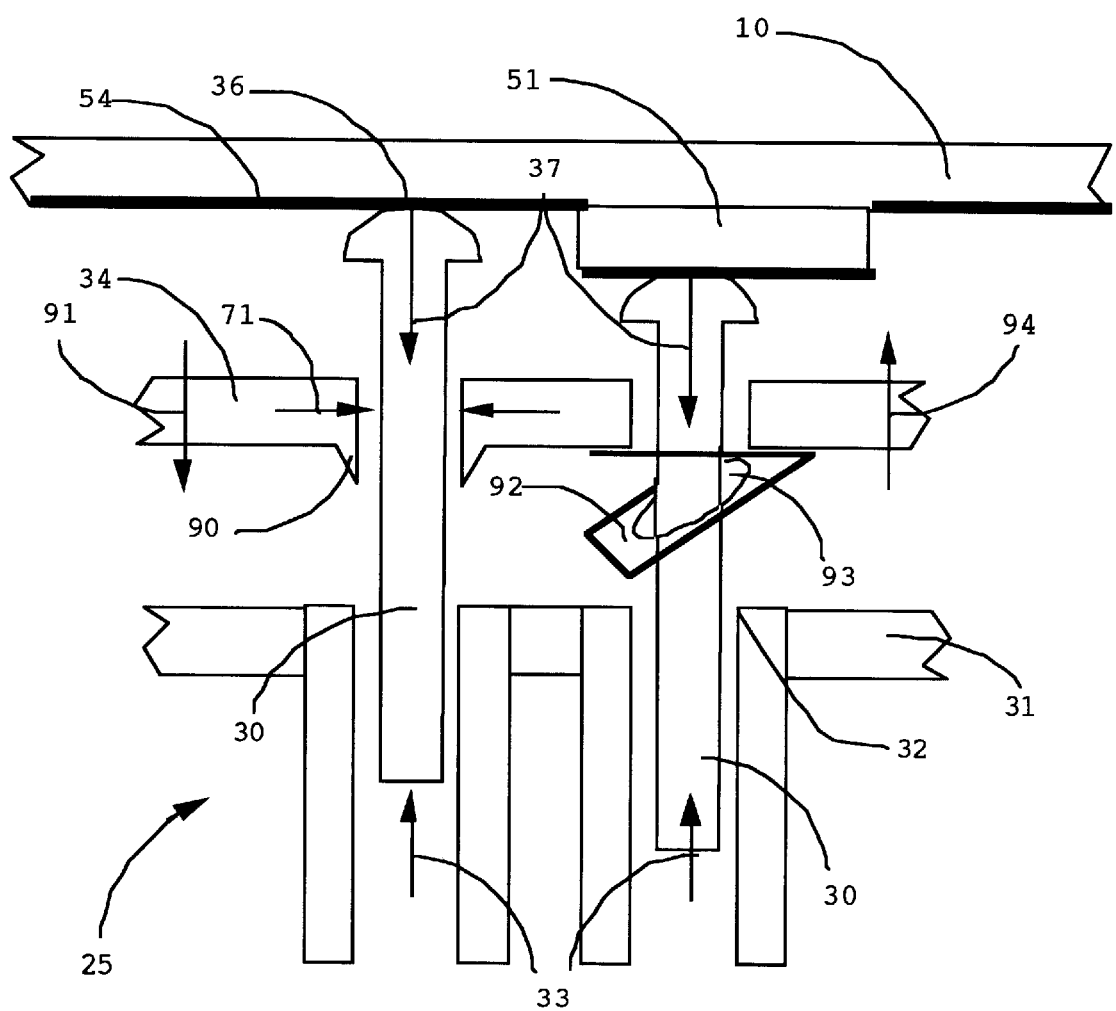
FIG. 9 is a sectional side elevation that illustrates second and third optional clamping mechanisms applying mechanical wedge clamping mechanisms.

FIG. 9 illustrates a third and fourth embodiment of the present invention, where the clamping force 71 is applied by various wedges. The embodiment is actuated by a respective motion 91, 94 of the clamping system 34. The motion 91, 94 actuates the clamping mechanisms 90, 92 which apply a clamping force 71 to the elongated support member(s) 30. One clamping mechanism shown is a wedge clamp 90 which applies the clamping force 71 when the wedge clamp 90 is brought together with the perforated member 31. An alternate clamping mechanism shown is a spring clamp 92 which applies the clamping force 71 when the spring clamp 92 is engaged. The elongated support member 30 passes through a pair of apertures 93 where when the spring clamp 92 is actuated and released, and the relation of the apertures 93 creates the clamping 71 and releasing forces respectively.

Figure 10:
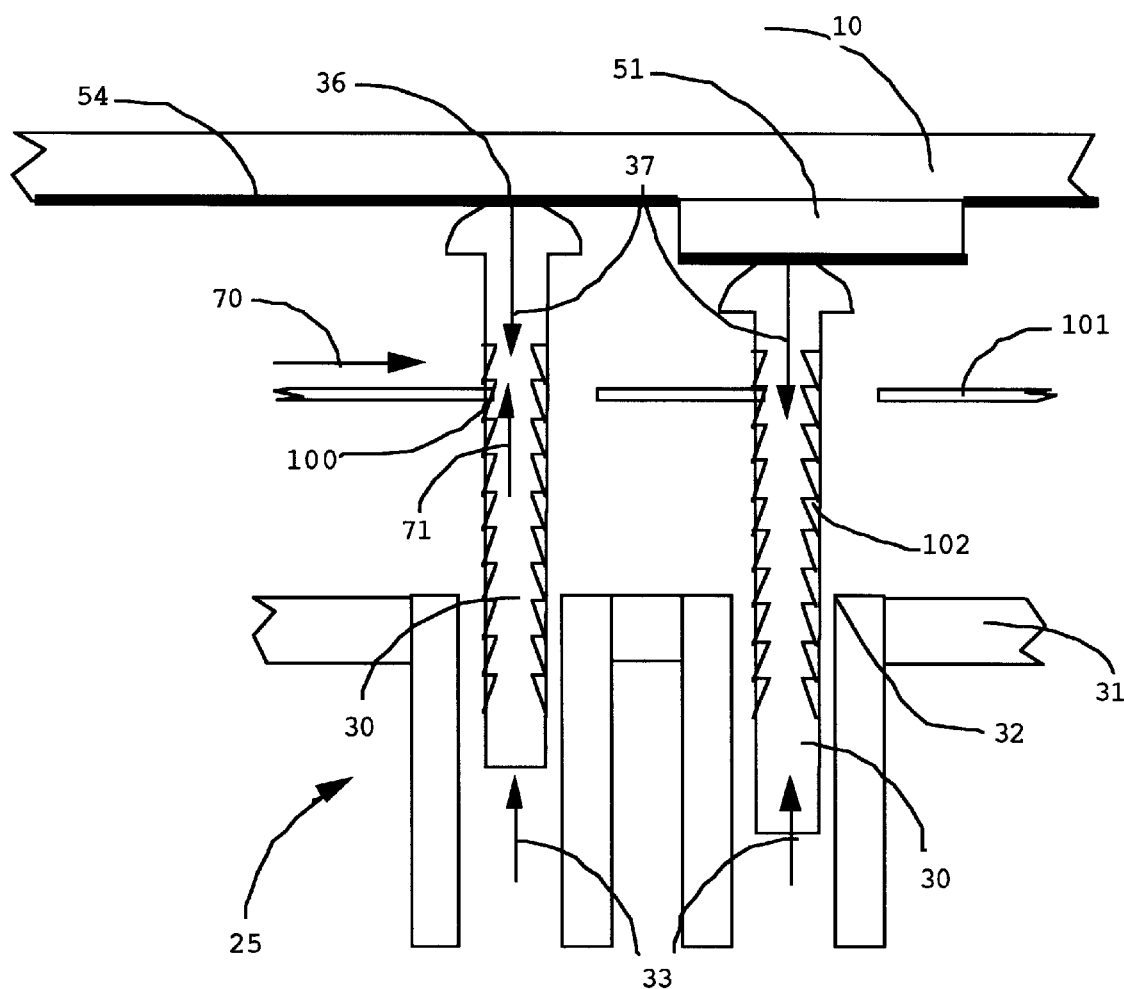
FIG. 10 is a sectional side elevation that illustrates a fourth optional clamping mechanism applying a support ledge to a notch.

FIG. 10 illustrates a fifth embodiment of the present invention, where the clamping force 71 is applied by placing a ledge 100 of a clamping member 101 under a notch 102. The embodiment is actuated 70 where the ledge 100 of the supporting member 101 clamping is placed under the respective notch 102 preferably within the elongated support member(s) 30. Placing the ledge clamping member 101 under the respective notch 101 supports the elongated support member(s) 30 proximate to the module 10, where the contacting surface 36 supports the module 10.

Various changes may be made to the embodiments shown herein without departing from the scope of the present invention which is limited only by the following claims.

What is claimed is:

1. A flexible, self conforming, support apparatus to support a module,
   the flexible support apparatus comprising:
   at least one perforated member whereby the perforated member has a plurality of apertures,
   a plurality of removable elongated support members, whereby the removable elongated support members can be located extending through an aperture within the perforated member,
   a respective contact surface on the elongated support members, where the contact surface abuts a module, and the elongated support members adjust along an axis of the removable elongated support members proximate to a profile of a contacting surface,
   a profiling mechanism which applies a homing force to locate the elongated support members to at least one of a home position and against the profile of the contacting surface,
   the profiling mechanism further maintains the elongated support members proximate the contacting surface of the module during the adjusting process, and
   a securing mechanism which substantially precludes movement of the removable elongated support members allowing them to support the module during the application of forces to the generally opposing side of the module.

2. The apparatus of claim 1 where the securing mechanism provides a clamping force to the plurality of removable elongated support members.

3. The apparatus of claim 1 where the securing mechanism utilizes a ledge and notch support system.

4. The apparatus of claim 2 where the securing mechanism includes a means to account for variations in tolerance.

5. The apparatus of claim 2 where the means to account for variations in tolerance consists of an elastomer.

6. The apparatus of claim 1 where the profiling mechanism is a coil spring(s).

7. The apparatus of claim 4 where the removable elongated support members are designed such that the coil spring can be located at least partially inside the removable elongated support member.

8. The apparatus of claim 1 where the profiling mechanism is a flat spring(s).

9. The apparatus of claim 1 where the profiling mechanism is a sheet of flexible material stretched between a first and second perforated member.

10. The apparatus of claim 1 where the contact surface of the elongated support members includes a pliant material to avoid damage to delicate surfaces of the module.

11. The apparatus of claim 1 where a vacuum is applied to the module through a vacuum chamber, the vacuum chamber provides vacuum to the module via at least one of through the flexible support apparatus and through the removable elongated support members, whereby the module is secured by the vacuum during processing.

12. A flexible, self conforming, support apparatus to support a printed circuit assembly during an application of forces to a generally opposing side of the printed circuit assembly, the flexible support apparatus comprising of:

a perforated member, a plurality of elongated support members, each extending through an associated aperture within the perforated members, and a securing mechanism which applies a securing force to the plurality of elongated support members through a compliant member.

13. The apparatus of claim 10, the apparatus further comprising:

a self restoring mechanism which automatically returns the elongated support member to a home position upon release of a clamping mechanism.

14. The apparatus of claim 11, whereby the self restoring mechanism is a coil spring.

15. The apparatus of claim 11, whereby the self restoring mechanism is a flat spring.

16. The apparatus of claim 11, the apparatus further comprises a plurality of perforated members, and where at least one of the perforated members is further utilized as a clamping mechanism, for applying a clamping force to more than one of the elongated support members.

17. The apparatus of claim 10, where the apparatus includes a means to provide vacuum to the module to aid in removing any warpage of the module, where the apparatus includes:

a system of vacuum wall members coupled to the perforated member where the system of vacuum wall members creates a vacuum chamber, and a passage to transfer vacuum from the vacuum source to the vacuum chamber.

18. The apparatus of claim 10, whereby the respective contact surface includes a pliant material to a avoid damage to delicate surfaces of the module.

19. A flexible, self conforming, support apparatus to support a module during an application of forces to a generally opposing side of the module, the flexible support apparatus comprising of:

at least one perforated member, a plurality of elongated support members, each extending through an associated aperture within the at least one perforated member, a respective contact surface on the elongated support members, where the contact surface abuts a module, and the elongated support members adjust along an axis of the elongated support members proximate to a profile of a contacting surface, a flexible material stretched in a manner to provide a self restoring force to the plurality of elongated support members, and a clamping mechanism for applying a clamping force to the elongated support member, whereby the clamping force substantially precludes movement of the elongated support members allowing them to support the module during the application of forces to the generally opposing side of the module.

20. The apparatus of claim 16 where at least one performed member is further utilized as the clamping mechanism.

21. A flexible, self conforming, support apparatus to support a module, the flexible support apparatus comprising of:

at least one perforated member, a plurality of elongated support members, a respective contact surface on the elongated support members, where the contact surface is to abut a module, and the elongated support members adjust along an axis of the elongated support members proximate to a profile of a contacting surface, a restoring mechanism comprising a sheet of flexible material stretched across at least one of the perforated members, where a homing force is created when the flexible material is depressed into the perforation of the perforated member, the restoring mechanism further maintains the elongated support members proximate the contacting surface of the module during the adjusting process, and at least one member for applying a clamping force to two or more of the elongated support members via at least one of directly and through a compliant material to the two or more elongated support members for maintaining a profile, whereby the clamping force substantially precludes movement of the two or more elongated support members, allowing them to support the module during the application of forces to the generally opposing side of the module.

22. A flexible, self conforming, support apparatus to support a module, the flexible support apparatus comprising of:

an at least one perforated member, a plurality of elongated support members, each extending through an associated aperture within the at least one perforated member, a respective contact surface on the elongated support members, where the contact surface is to abut a module, and the elongated support members adjust along an axis of the elongated support members proximate to a profile of a contacting surface, a restoring mechanism, which applies a homing force to return the elongated support members to a home position, the restoring mechanism further maintains the elongated support members proximate the contacting surface of the module during the adjusting process, and at least one perforated member for applying a clamping force to two or more of the elongated support members via at least one of directly and through a compliant material to the two or more elongated support members for maintaining a profile, whereby the clamping force substantially precludes movement of the two or more elongated support members, allowing them to support the module during the application of forces to the generally opposing side of the module.

* * * * *